United States Patent [19]
Wood

[11] Patent Number: 5,551,917
[45] Date of Patent: Sep. 3, 1996

[54] TORQUE REGULATING DEVICE

[75] Inventor: William B. Wood, Kalamunda, Australia

[73] Assignee: Vysarn Pty Ltd., Bently, Australia

[21] Appl. No.: 475,746

[22] Filed: Jun. 7, 1995

Related U.S. Application Data

[63] Continuation of Ser. No. 129,491, Sep. 30, 1993, abandoned, which is a continuation of Ser. No. 768,978, filed as PCT/AU90/00142, Apr. 12, 1990 published as WO90/12966, Nov. 1990, abandoned.

[30] Foreign Application Priority Data

Apr. 14, 1989 [AU] Australia .................................. PJ3668

[51] Int. Cl.$^6$ .............................. F16D 7/02; F16D 13/76
[52] U.S. Cl. .......................................... 464/46; 192/70.14
[58] Field of Search .................................. 464/45, 46, 48, 464/41, 7, 10; 192/56 R, 70.14, 107 M, 107 R; 254/901

[56] References Cited

U.S. PATENT DOCUMENTS

| | | |
|---|---|---|
| 2,779,175 | 1/1957 | Lehen . |
| 3,105,371 | 10/1963 | Forrest ...................................... 464/46 |
| 3,201,953 | 8/1965 | Firth . |
| 3,319,751 | 5/1967 | Sacchini ................................... 464/46 |
| 3,376,714 | 8/1968 | Manoni ..................................... 464/46 |
| 3,450,243 | 6/1969 | Kraeling ................................... 464/48 |
| 3,493,087 | 2/1970 | Freeman et al. ...................... 192/70.14 |
| 3,550,739 | 12/1970 | Wiltsey ............................... 192/107 M |
| 3,602,346 | 8/1971 | Daugherty ................................ 464/46 |
| 3,605,443 | 9/1971 | Rederman ................................. 464/46 |
| 3,695,407 | 10/1972 | Peery .................................... 192/70.14 |
| 3,986,588 | 10/1976 | Kuzarov ............................... 192/107 R |
| 4,060,159 | 11/1977 | Chaney et al. . |
| 4,133,434 | 1/1979 | Chierici . |
| 4,501,570 | 2/1985 | Konrad ..................................... 464/48 |
| 4,508,212 | 4/1985 | Bolle ....................................... 464/48 |
| 4,519,209 | 5/1985 | Kline ....................................... 464/48 |
| 4,529,209 | 5/1985 | Kline ....................................... 464/48 |
| 4,533,032 | 8/1985 | Lamarche . |
| 4,624,650 | 11/1986 | Hiruma et al. ........................... 464/46 |
| 4,645,472 | 2/1987 | Heidenreich ............................. 464/48 |
| 4,706,801 | 11/1987 | Vessey .................................... 464/46 |
| 4,725,151 | 2/1988 | Orndorff, Jr. . |
| 4,741,424 | 5/1988 | Kitano et al. ....................... 192/107 M |
| 4,947,972 | 8/1990 | Lea ......................................... 464/48 |

FOREIGN PATENT DOCUMENTS

| | | |
|---|---|---|
| 1078797 | 11/1954 | France . |
| 2145890 | 2/1973 | France . |
| 2154027 | 5/1973 | France . |
| 60-164047 | 8/1985 | Japan . |
| 62-80311 | 10/1985 | Japan . |

*Primary Examiner*—Daniel P. Stodola
*Assistant Examiner*—Eileen A. Dunn
*Attorney, Agent, or Firm*—Bliss McGlynn, P.C.

[57] ABSTRACT

A torque regulating device (10) characterized by a disc (34) arranged to be fixedly attached to a shaft, discs (40, 50) of ultra high molecular weight polyethylene (UHMW PE) friction material, a gear wheel (44) rotatably mounted about the shaft, the discs (40, 50) being respectively disposed between the disc (34) and the gear wheel (44) and between a further disc (52) and the gear wheel means (44) such that the discs (40, 50) are clampable to the gear wheel (44), wherein the disc (40, 50) is arranged cooled by oil, in use. The UHMW PE may be replaced by ceramic material in disclosed alternative embodiments.

29 Claims, 7 Drawing Sheets

TORQUE REGULATING DEVICE

This is a continuation of application Ser. No. 08/129,491 filed on Sep. 30, 1993, now abandoned, which is a continuation of Ser. No. 07/768,978, filed as PCT/AU90/00142 on Apr. 12, 1990, published as WO90/12966 on Nov. 1, 1990, now abandoned.

The present invention relates to a torque regulating device.

BACKGROUND OF THE INVENTION

The device of the present invention is specifically intended for use in paying out and recovering electrical cables (and also hoses). However, it is to he appreciated that the present invention is of much wider applicability. Generally, cables are recovered on moving machinery by reeling onto a parallel reel (utilising a layered mechanism to give uniform layering) or onto a radial reel, where, in most cases, the cable lays vertically on a single plane. Other types are "standard" lay, where cable lays horizontally in three then two configuration and random lay where cable lays as it falls.

All the above types are in general use as each has specific advantages either in cost saving, dimensions, or cable tension reduction.

The prime requisite for a cable reel is to payout and recover cables without causing excessive tension in the cable itself. Cable manufacturers have developed cable which can take quite high tensions and are very flexible, but the upper limits of curvature and tension are well defined. Any excursion beyond this limit will lead to premature failure of a very costly item. For short runs of cable and low frequency of use, spring reels were developed and these are quite satisfactory. The demand for reels which could handle long runs of cable, high lift of cable and high duty cycles led to the development of several types Of reel drives, each with claims to satisfactory operation which in many cases were not justified.

The first were "Torque Motors" and hydraulic drives. Both these types are still in use, although hydraulic drives are uncommon. They power the reel in payout and recovery and by the use of sensors which "read" cable tension, try to control the speed to keep cable tension within acceptable limits. The cable tension sensors vary from simply mechanical devices to highly sophisticated micro processor systems with continuous monitoring. Also, control of starting torque and braking torque still seems to be a problem as the inertia of the reel and dries is not fully controlled and cable overtension with subsequent failure is common.

A later development in cable reeling was a friction drive unit which slipped When torque exceeded a certain value. The cable was reeled in under power by the drive unit and payed out by the cable driving the reel. One of these units used a spring loaded steel disc bearing on one side of a bronze worm in the drive unit. Lubrication was by the oil normally in the gear unit and the whole unit was enclosed. This unit depends on the slipping faces being lubricated at all times to prevent wear.

However, to prevent hydro-dynamic lubrication of the rubbing faces, where friction would be too low to be practical, fairly high unit pressures are used. While running, the drive gives a reasonably constant torque during payout and recovery, but if the cycle is interrupted for a short time, the oil film is partly extruded from between the slipping faces, the slipping faces contact each other and friction increases. On restarting, the payout cable tension to overcome this friction rises up to five times the normal running tension and this is rarely acceptable.

Further, if air cooling is used for the slipping faces, the units become larger and more expensive.

A later development of the friction drive was an air-cooled disc with circular asbestos friction pads uniformly loaded onto the disc with stacks of Belville spring washers. Each spring stack had a torque range and the torque could be adjusted within this range by a gear and threaded pressure plate. Being dry, this unit did not have the fault of high starting torque inherent in the oil lubricated unit. The unit was ideal within its torque and power range and, although fairly complicated and expensive, was reliable and had an excellent working life. The banning of the use of asbestos meant that the pad friction lining material had to be changed. The performance of the unit remained unchanged but the life of the friction pads and discs was considerably reduced and any competitive edge was lost. Research is continuing for a suitable friction material. The present invention seeks to overcome or at least alleviate some of the aforementioned problems of the prior art.

SUMMARY OF THE INVENTION

In accordance with one aspect of the present invention there is provided a torque regulating device characterised by a disc arranged to be fixedly attached to a shaft, friction material having a low coefficient of friction which remains substantially constant whether the friction material is dry or lubricated, a gear wheel means arranged to be mounted about the shaft, the friction material being disposed between the disc and the gear wheel means, and means being provided for clamping the friction material between the disc and the gear wheel means.

BRIEF DESCRIPTION OF THE DRAWINGS

The present invention will now be described by way of example, with reference to the accompanying drawings in which.

DESCRIPTION OF THE INVENTION

Figure 1:
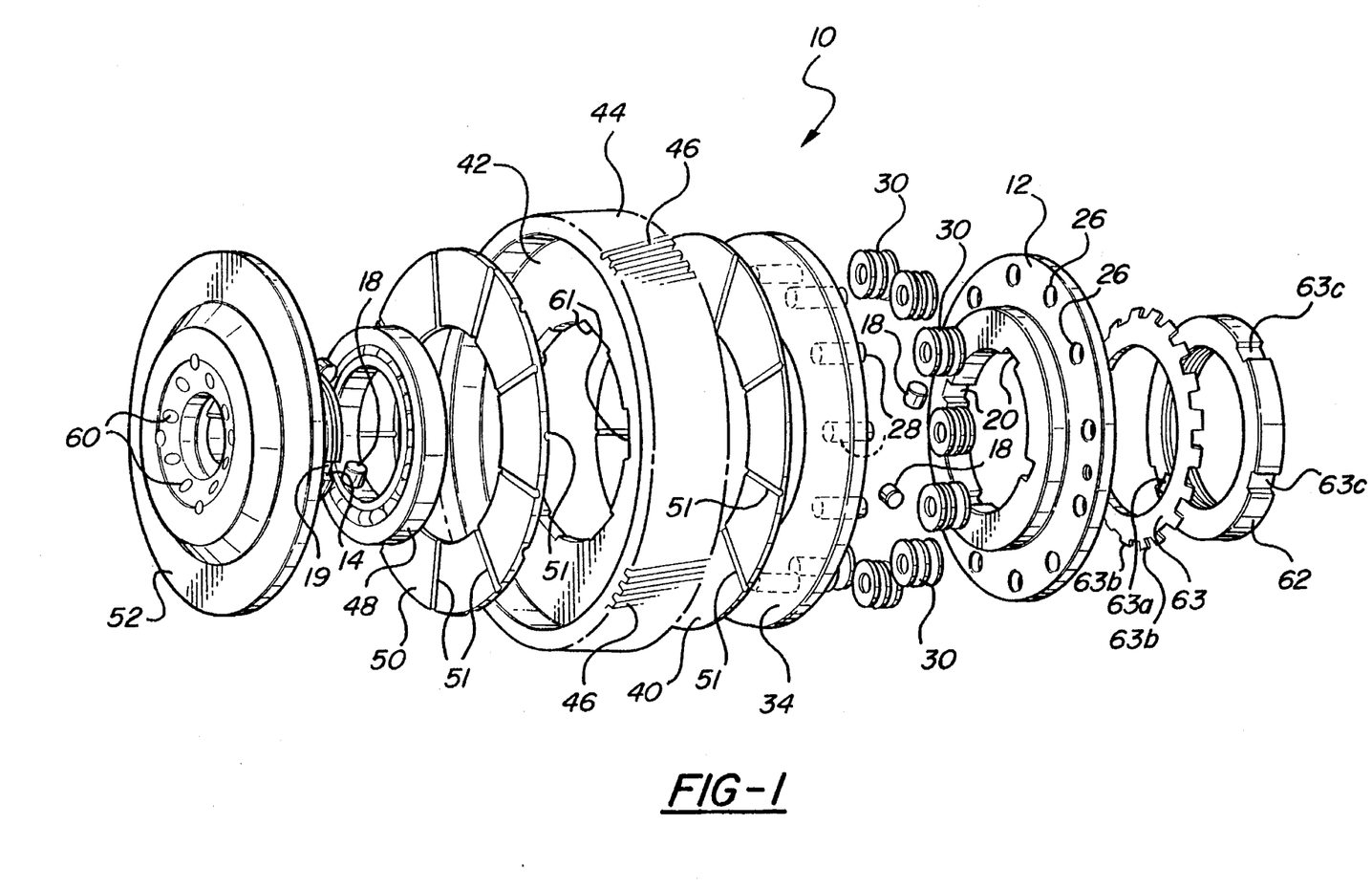
FIG. 1 is an upper perspective view of a first embodiment of a torque regulating device in accordance with the present invention in an exploded condition.

Shown in FIG. 1 is a first embodiment of a torque regulating device 10 comprising an annular pressure plate 12 keyed to an externally threaded sleeve 14, by a plurality of cylindrical roller keys 18. Each key 18 is received in a respective external keyway 19 in the sleeve 14 and a respective internal keyway 20 in the pressure plate 12. Spaced around the circumference of the pressure plate 12 are a plurality of apertures 26 each able to receive a respective spigot 28 passing through a spring means in the form of a stack of Belville washers 30. The spigots 28 are located around the circumference of a first annular disc 34. The disc 34 is keyed to the pressure plate 12 by the spigots 28. Thus, the pressure plate 26 and the disc 34 rotate in unison.

Adjacent to the disc 34 is a first annular friction disc 40 of friction material. The friction disc 40 is formed of a low friction material of a type which has a low coefficient of friction which remains substantiality constant regardless of whether the friction disc 40 is dry or lubricated. Typically, each friction disc 40 is formed of an ultra high molecular weight polyethylene (UHMW PE).

The low friction material is selected according to the working conditions of the device 10, as will be described hereinafter.

The friction disc 40 bears on a web 42 of a gear wheel 44 having peripheral teeth 46. The gear wheel 44 is carried on a bearing 48 which is mounted about a step 49 of the sleeve 14 (see FIG. 2) and is thus able to rotate relative to the shaft.

Figure 2:
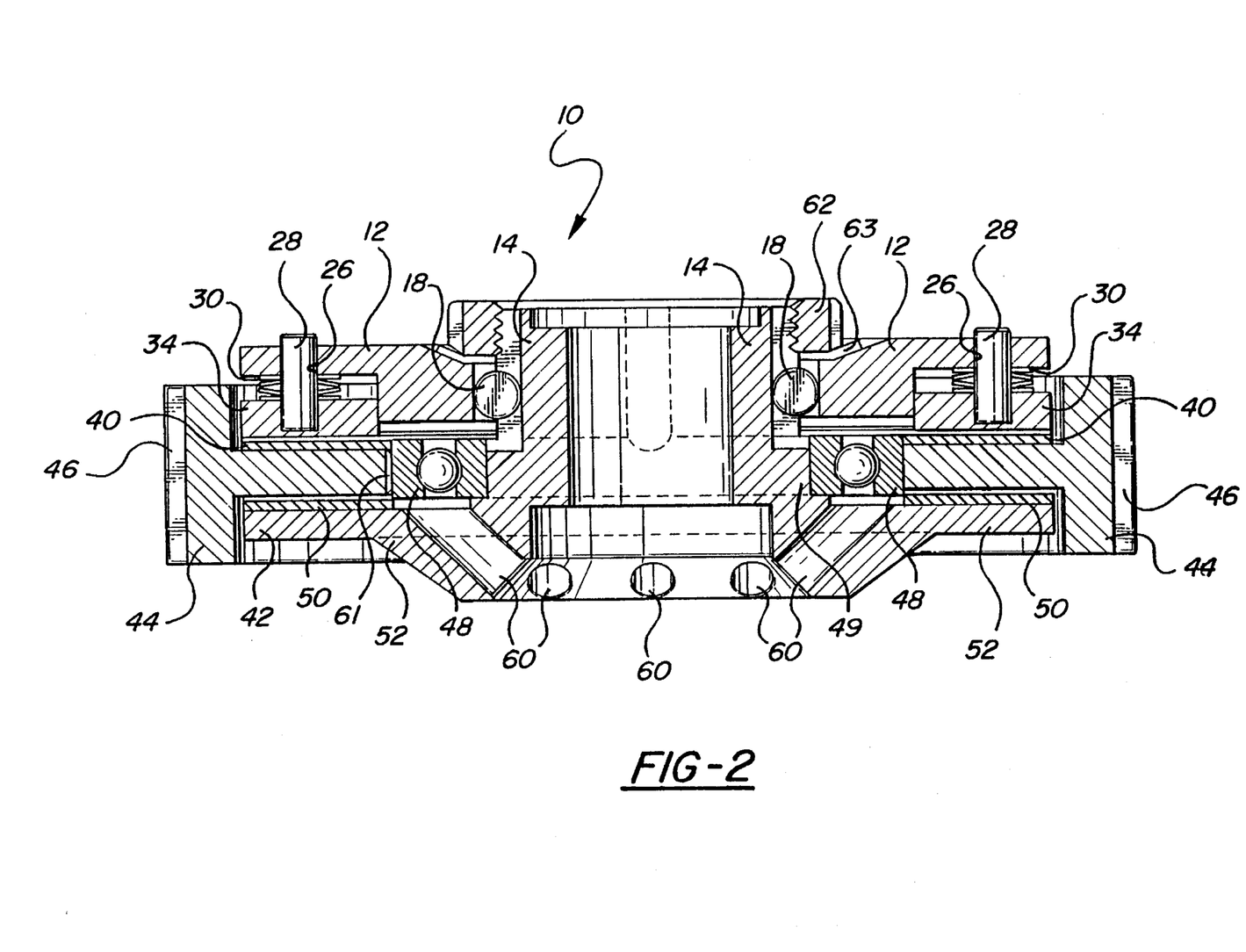
FIG. 2 is a sectional view of the torque regulating device of FIG. 1.

A second annular friction disc 50 formed of low friction material, similar to the friction disc 40 bears upon the opposite side of the web 42. The friction disc 50 is adjacent a second annular disc 52 which is formed integrally with the sleeve 14. The low friction discs 40 and 50 sit on the bearing 48 as can be seen in FIG. 2 so that the friction discs 40 and 50 are isolated from rotation of the shaft.

The disc 52 has holes 60 to allow lubricating liquid, such as oil, to pass therethrough and cool the friction disc 50. The web 42 has inwardly facing notches 61 adjacent the periphery of the bearing 48, to allow passage of lubricating liquid to cool the friction disc 40. It has been found that oil is not able to pass through the bearing 48 at high speed. The notches 61 allow the oil to pass through to the friction disc 40 to prevent it overheating.

Further, the friction discs 40 and 50 have radial grooves 51 to allow passage of lubricating liquid. The radial grooves 51 are cut on both sides of the friction discs 40 and 50 and are staggered on opposite sides thereof as can be seen in FIG. 1.

To cool the faces of the friction discs 40 and 50 oil flows into the radially inclined oil passages 60. The oil flows radially through the passages 60 assisted by centrifugal force and passes to the interior of the apparatus adjacent the bearing 48.

At slow speeds oil passes through the bearing 48 and then radially through the outer faces of the friction discs 40 and 50 finally discharged through a gap between the disc 34 and the gear wheel 44.

At high speeds churning of the oil in the bearing 48 prevents oil flow and there is a tendency for overheating to occur. Thus, the notches 61 are provided in the web 42. The notches 61 are located outwardly of the bearing 48 and are proportioned to divide oil flow between the friction faces of both friction discs 40 and 50.

The inner diameter of the friction discs 40 and 50 clear the notches 61 so that oil can enter the radial slots 51 or both faces of the friction discs 40 and 50.

The threaded sleeve 14 passes through the disc 34 and the pressure plate 12.

An internally threaded locknut 62 threadedly engages the threaded sleeve 14 and bears against the pressure plate 12 to thereby clamp the friction discs 40 and 50 against the web 42. A lockwasher 63 is disposed between the locknut 62 and the pressure plate 12. The lockwasher 63 has an axially projecting tang 63a which is arranged to be disposed in one of the keyways 20 and a plurality of radially projecting tangs 63b. The locknut 62 contains a plurality of spaced peripheral notches 63c each arranged to receive a tang 63b. In this way, the locknut 62 is prevented from inadvertently loosening or tightening.

It is possible to deliberately loosen or tighten the locknut 62 and so vary the unit pressure clamping the friction discs 40 and 50 against the web 42.

Figure 7:
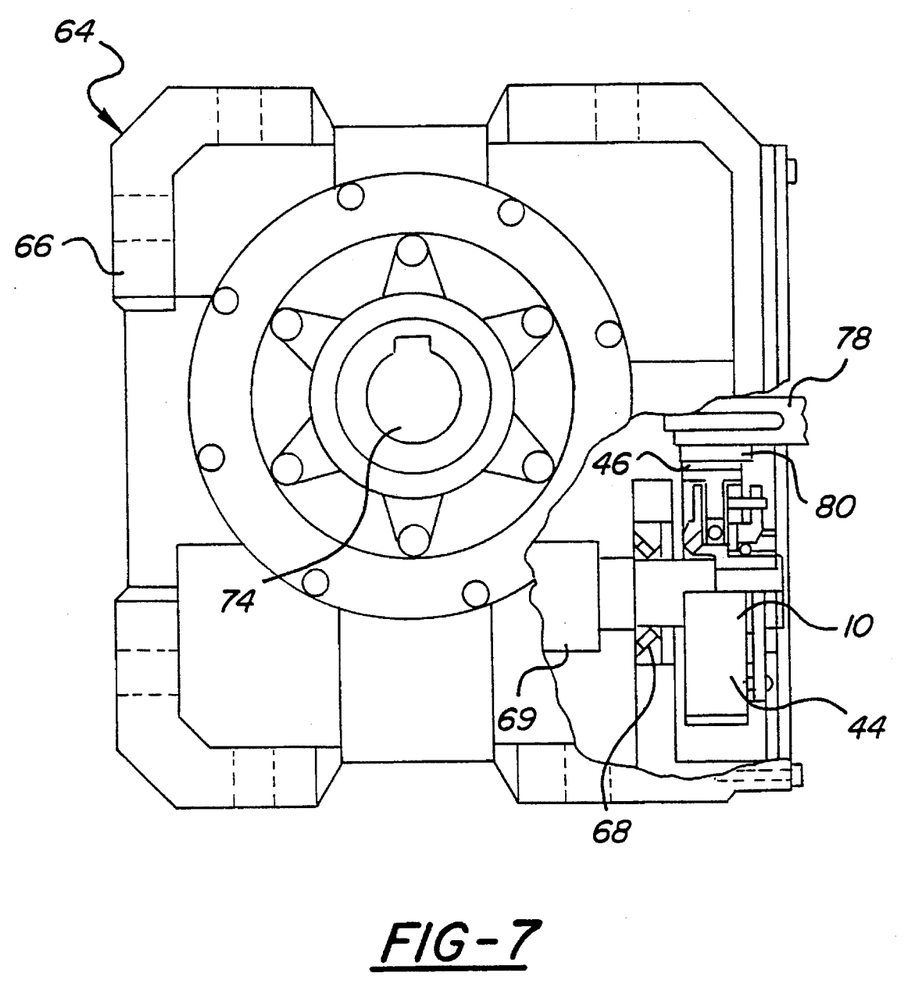
FIG. 7 is a side view of a gearbox partially broken away incorporating the device of FIGS. 1 and 2, FIGS. 3 and 4 or FIGS. 5 and 6.

Shown in FIG. 7 is a gearbox 64 incorporating the torque regulating device 10, of FIG. 1. The gearbox 64 comprises a casing 66 and bearings 68 only (one of which can be seen), internal of the casing 66, to support a shaft 69. The sleeve 14 is keyed to the shaft 69 with a rectangular key and returned with a circlip. The shaft 69 has a worm gear between the bearings 68, to engage a ring gear keyed to an output shaft 74. It is to be appreciated that, as an alternative, a bevel helical gear combination may be used instead of the worm gear and ring gear combination.

An external motor is attached to the casing 66. A gear 80 is keyed to a motor shaft 78 to engage the gear teeth 46 of the gear wheel 44. Where lower speeds are required the motor may be replaced with a gear motor.

Lubricating liquid, such as oil, is contained within the casing 66 to cool the torque regulating device 10 and simultaneously lubricate the bearings and gear teeth within the casing 66. This cooling occurs because the device 10 is at least partially immersed in the cooling fluid. Usually, the device 10 is almost totally immersed in the cooling fluid. However, it is to be appreciated that other methods of applying cooling fluid other than splash lubrication may be used. For example, pressure lubrication by a pump may be used instead.

In use, a load (not shown) such as a reel having cable wound thereon, is attached to the output shaft 74. The motor is then activated to wind in the cable.

Referring now to FIG. 1, the gear 80 engages and rotates the gear 44. The washers 30 bear on the disc 34 to urge the friction discs 40 and 50 onto the web 42 to thereby clamp the web 42 therebetween. By varying the number, thickness and compression of the washers 30, the unit pressure clamping the friction discs 40 and 50 onto the web 42 may be varied. Such clamping results in a friction force which resists rotation of the gear 44 relative to the friction discs 40 and 50. If the torque supplied by the motor is greater than the break out torque i.e. the maximum friction force supplied by the friction discs 40 and 50, then the shaft 69 will rotate or slip relative to the gear 44. This results in the discs 34 and 52 slipping on their respective low friction discs 40 and 50. Further, the web slips on the low friction discs 40 and 50.

The worm gear rotates in Unison with the shafts 69 which cooperates with the ring gear to rotate the output shaft 74 to whereby wind in cable.

Further, the torque applied to the shaft 69 in such a situation will be essentially constant at the break out torque.

This is important when winding in cable so as to wind in the cable at an essentially constant tension so as not to unduly stretch the cable. The value of the "break out" torque may be varied by varying the unit pressure This is achieved by suitably loosening or tightening the locknut 62.

However, this slip generates heat which must be dissipated. By virtue of the device 10 being at least partially immersed or otherwise contracted by lubricating, oil, heat is carried away by the oil. Heat absorbed by the oil is then transferred to the casing 66 and thereby dissipated.

Further, by virtue of the material properties of the friction discs 40 and 50, the break out torque is substantially uneffected by the presence of lubricating oil.

Even further, when the device 10 is not operating, the washers 30 cause the lubricating oil to be squeezed out from between the friction discs 40 and 50 and the web 42. In some prior art devices, this will increase the coefficient of friction and hence the value of the break out torque. This leads to large torque spikes or momentary increases in the value of the break out torque. This results in stretching of the cable. Due to the aforesaid material properties of the friction discs 40 and 50 these torque spikes are substantially absent from the device 10 of the present invention.

The material of the friction discs 40 and 50 is preferably a low pressure high density polyethylene with a very high degree of polymerisation. The molecular weight, determined by the viscosimetric method is between 3 and 8 million. As molecular weight of polyethylene increases, higher values are obtained for important properties like wear resistance and notched impact strength. These materials are commonly referred to as ultra high molecular weight polyethylene (UHMW PE). They should not be confused with high molecular weight polyethylene (HMW PE) which has a molecular weight of about 500,000 and which cannot reach the level of UHMW PE in terms of properties.

A particularly suitable UHMW PE is sold under the Trade Mark "SOLIDUR" and a particularly suitable form of "SOLIDUR" is "SOLIDUR SUPER".

Cooling is critical with this material and torque is governed by the applied pressure and velocity of the rubbing faces. Typically, the UHMW PE is able to withstand a temperature of about 200° C. without any substantial change in its properties or structure. The majority of torque regulating applications can be met with this material. The polyethylene discs 40 and 50 have been found not to wear to any appreciable extent, even under the high bearing load used and adjustment ceases to be a critical requirement, although the device 10 has an adjustment facility.

Alternatives to the above material were tried and initial tests were with "TEFLON" coated on aluminium discs contacting a steel interface, aluminium being a good conductor to remove heat by conduction. The "TEFLON" was dissolved by the lubricating oil at the temperature attained.

Carbon impregnated "TEFLON" failed in a similar manner. When nylon was tried it softened and extruded at well below the power requirements of the device 10. In use, when it is desired to payout cable the motor is deactivated. The output shaft 74 then rotates, to payout cable. The ring gear cooperates with the worm gear and thereby rotates the shaft 69.

The motor 76 is deactivated and locked by a brake on the motor so that the gear 44 is held substantially stationary by virtue of its engagement with the gear 80. Thus, when unwinding, the gear 44 is stationary and the shaft 69 and friction discs 40 and 50 slip relative to the shaft 69. Therefore, the torque applied to the shaft 69 is the break out torque. As when winding cable in, this slip generates heat which is absorbed by the lubricating oil. Again, due to the properties of the friction discs 40 and 50 the torque applied to the shaft 69 is substantially constant at the break out torque.

Figure 3:
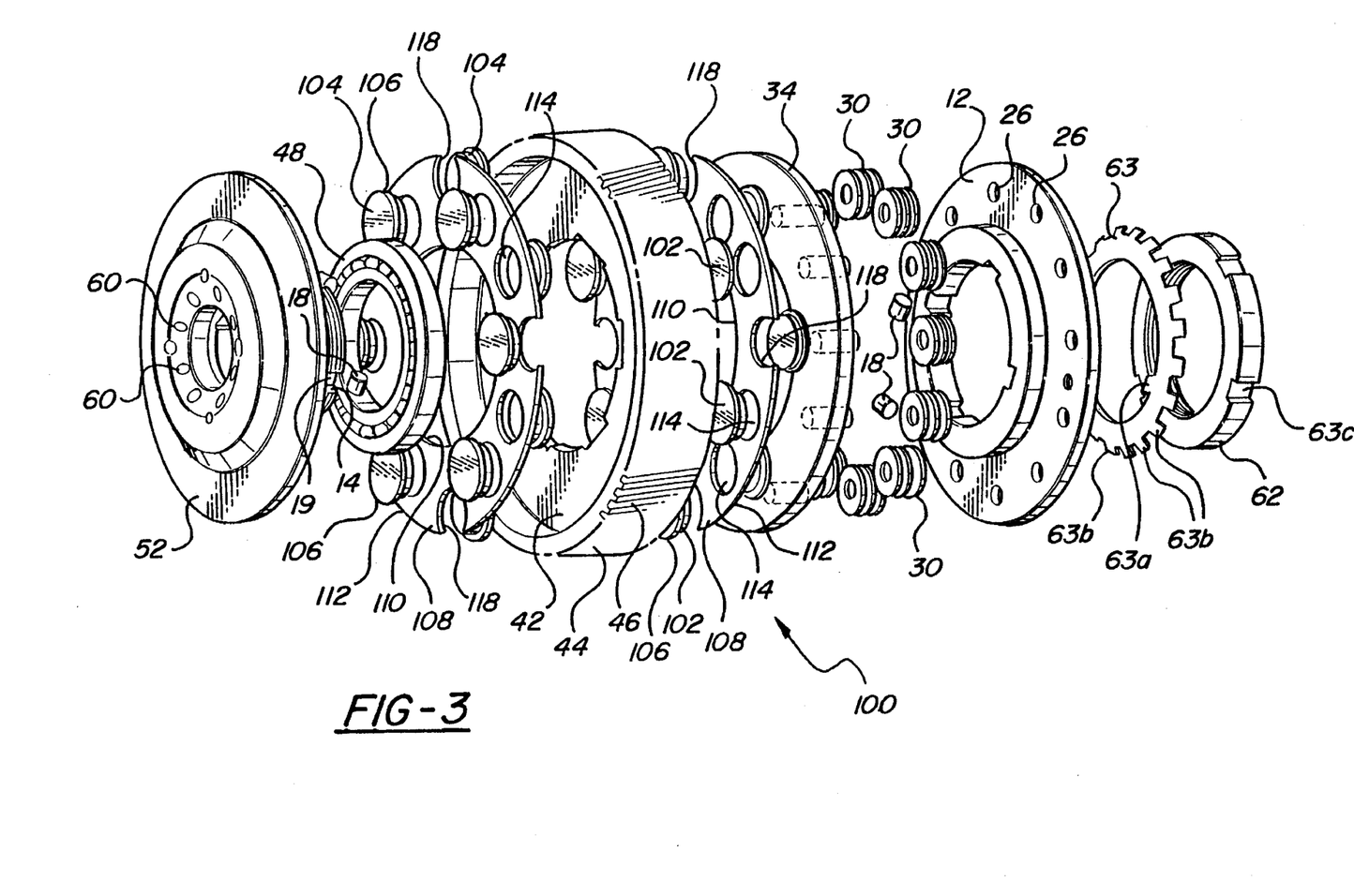
FIG. 3 is an upper perspective view of a second embodiment of a torque regulating device in accordance with the present invention in an exploded condition.
Figure 4:
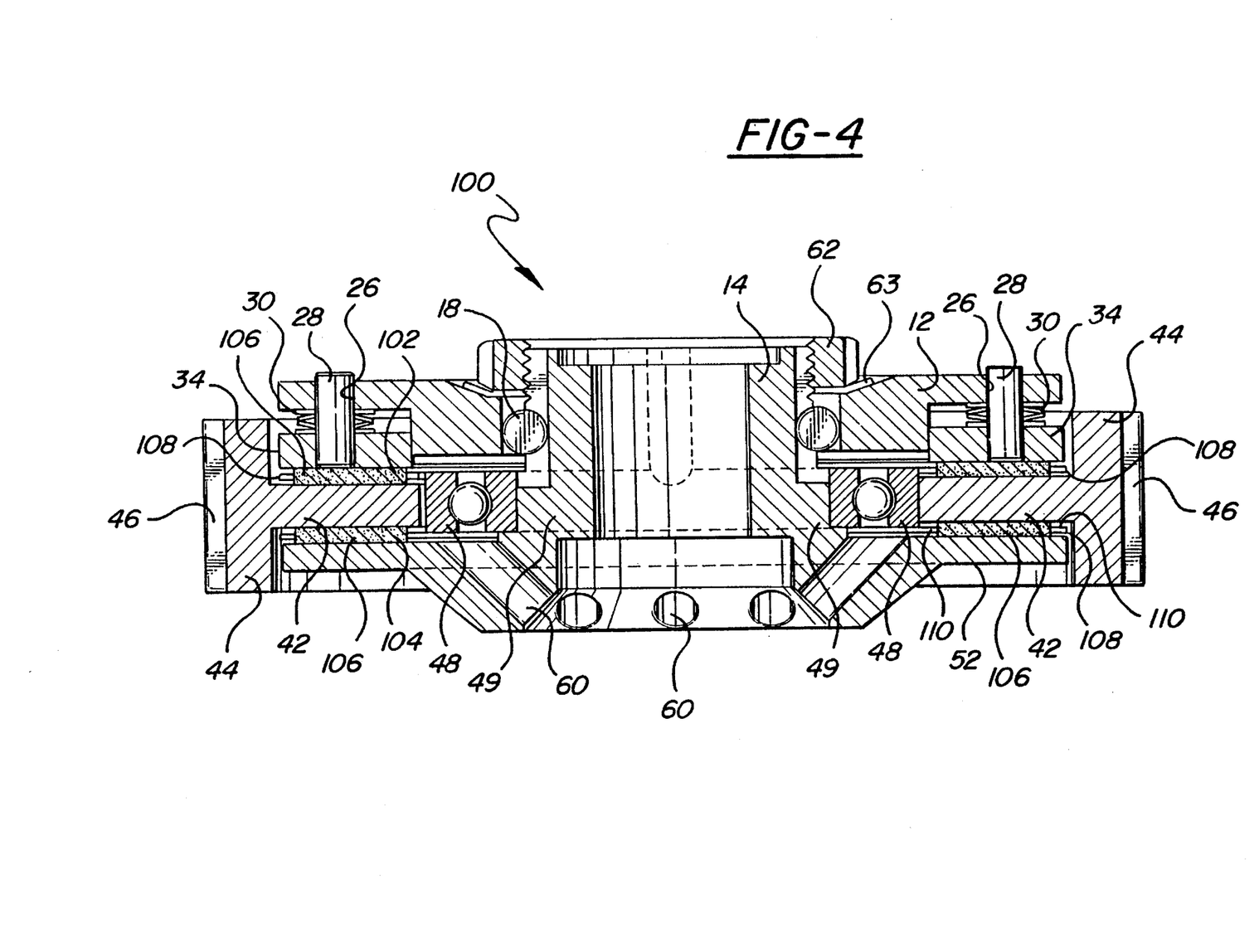
FIG. 4 is a sectional view of the torque regulating device of FIG. 3.

Shown in FIGS. 3 and 4 is a second embodiment of a torque regulating device 100, like numerals denoting like parts. If the unit pressure is not high enough to extrude the oil, from between the slipping faces then the torque is provided by shearing of the oil film, especially at high speeds. When the faces stop slipping, the oil is still between the faces and any applied torque from the reel causes slippage to occur at a very slow fate due to the hydrodynamic (full film) lubrication.

If the reel is restrained for a few seconds, the oil between the faces is partially extruded and boundary lubrication, with its high co-efficient of friction, takes over. This characteristic is of value in high speed, low torque reels which are reversed at a high rate, as payout friction is virtually zero. However, if the reel has a high vertical drop then the weight of cable will cause the reel to unwind slowly at a very low torque and dump the cable. This is sometimes undesirable, for example, in window washing applications.

To cause the device 100 to hold the cable when the drive stops, the unit pressure on the slipping faces must be high enough to extrude the oil on stopping. With the fixed areas of the annular discs of low friction material 40 and 50 (FIGS. 1 and 2) this would result in a "break out" torque which was too high for some applications. Further, the annular rings tended to restrict flow of the cooling oil at high speed so the slipping speed is limited at high pressures.

Thus, it is necessary to have a sufficiently high unit pressure to extrude oil from between the friction discs 40 and 50 and the webs 42 and simultaneously have a sufficiently low break out torque in order not to overstress any cables. This is achieved by reducing the area of the friction discs 40 and 50 whilst maintaining a high unit pressure.

Reduction of the area is achieved by replacing the friction discs 40 and 50 with a plurality of UHMW PE buttons 102 and 104. Each button 102 and 104 has a circumferential flange 106. The buttons 102 and 104 are received and held relative to each other in annular metal button cages 108. The cages 108 have inner edges 110 and outer edges 112. The cages 108 each have a plurality of evenly spaced first apertures 114 between the inner edge 110 and the outer edge 112. The cage 108 also has a plurality of spaced second, openapertures 118. Buttons 102, or 104 disposed in the second apertures 118 extend past the outer edge 112 to contact the inner periphery of the gear 44. This centralises and locates each cage 108 relative to the web 42. This prevents the buttons 102 and 104 moving and thereby changing the "break out" torque.

By varying the number of buttons 102 and 104, the break out torque may be accordingly varied.

As shown, the buttons 102 and 104 are arranged in staggered manner. That is, the buttons 102 and 104 are arranged such that respective flanges 106 of adjacent buttons 102 and 104 are on opposite sides of the cages 108. This prevents the cages 108 contacting the web 42 and the discs 34 and 52. This complete isolation of the cages is important because any wear particles resulting from such contact may contaminate the buttons 102 and 104 and alter their coefficients of friction.

In use, the device 100 operates in a similar manner to the device 10 of FIG. 1.

However, due to the buttons 102 and 104 being spaced around the cage 108, there is a greater space for oil to flow through and cooling is thereby improved.

Figure 5:
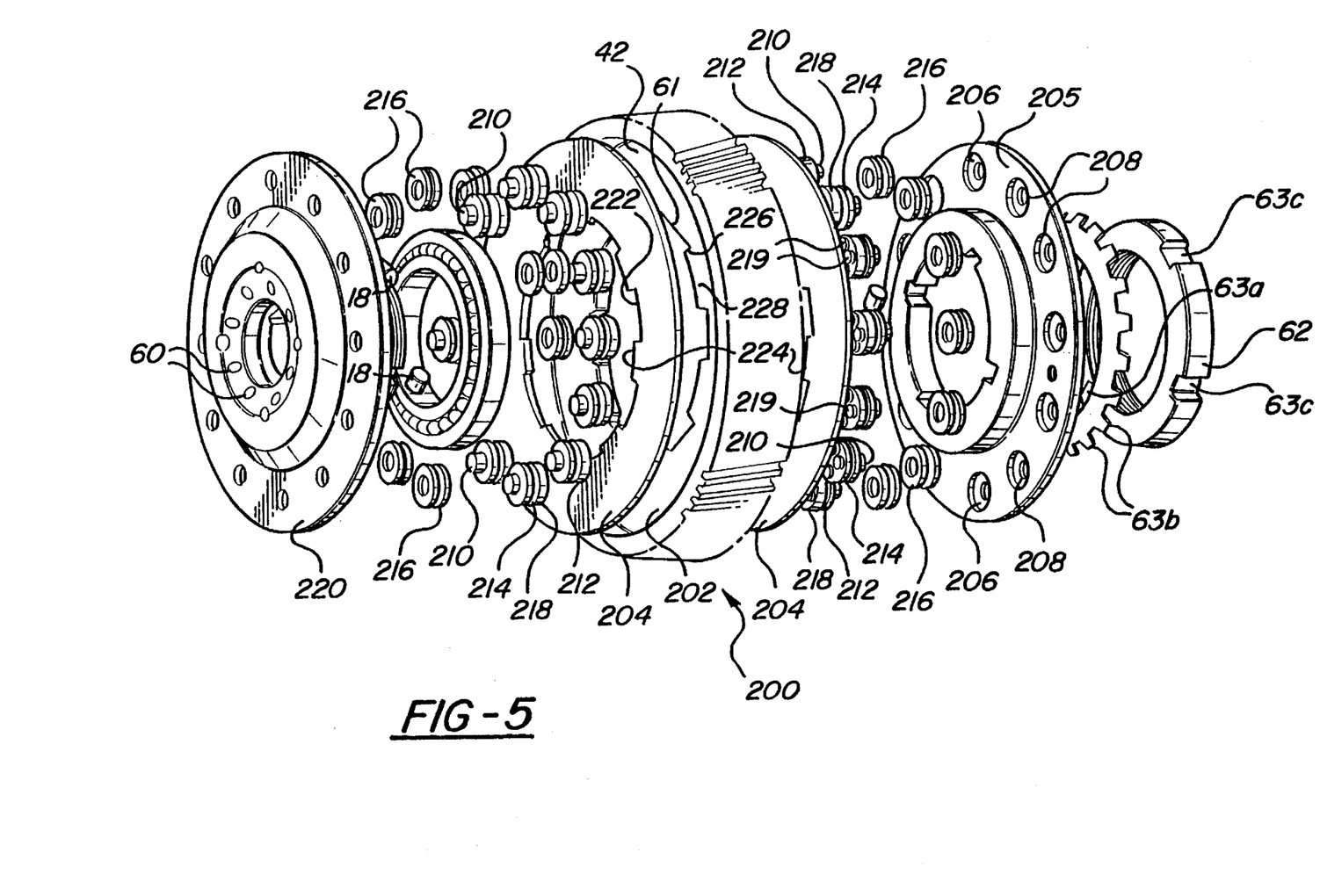
FIG. 5 is an upper perspective view of a third embodiment of a torque regulating device in accordance with the present invention in an exploded condition.

Further, the unit pressure clamping the buttons 102 and 104 onto the web 42 is sufficient to extrude oil from between the buttons 102 and 104 and the web 42. In combination with the reduced contact area of the buttons 102 and 104, compared to the friction discs 40 and 50 this results in a device 100 which, in addition to the benefits of the device 10 of FIG. 1, holds when it stops rather than slipping. Shown in FIG. 5 is a third embodiment of a torque regulating device 200, like numerals denoting like parts. In some very heavy duty applications, the temperature of the oil may exceed 200° C. This may be beyond the upper working limit of even the ultra high molecular weight polyethylene. Thus, use of the UHMW PE will result in unacceptable performance and/or degradation of the UHMW PE. The embodiment of FIG. 5 is primarily intended for ceramic materials.

Located on each side of the web 42 is an annular recess 202 arranged to receive a respective annular ceramic disc 204. Each recess 202 locates its respective disc 204 radially of the web 42.

The pressure plate 12 and the disc 34 have been replaced by an annular disc 205. The disc 205 has a plurality of evenly spaced recesses 206. Each recess 206 has an aperture 208 extending therethrough.

Slidable in each aperture 208 is a spigot 210, of a pressure button 212. Each button 212 has a steel disc 214 at one end of the spigot 210 and is arranged to compress a stack of Belville spring washers 216 located in a respective recess 206. A respective spigot 210 passes through a stack of washers 216 and serves to locate them in the recess 206.

On the side thereof remote from the spigot 210 each disc 214 bears on a respective ceramic button 218 which is also located in the respective recess 206. Each disc 214 urges its respective button 218 against a respective one of the annular ceramic discs 204. Each button 218 has an outer face formed with a plurality of flat topped projections 219 which reduce the overall area of contact of the button 218 with the disc 204. That is the projections 219 have outer slipping faces which collectively have a smaller area than the button 212 as a whole.

A disc 220 is constructed similarly to the disc 205 and it also contains recesses and apertures corresponding with the recesses 206 and apertures 208 of the disc 204.

The slipping faces of the projections 219 and the discs 204 are ground to an extremely fine surface finish typically below an average surface roughness of about 55 microns. It is to be appreciated that the ceramic buttons 218 may incorporate a spigot. This would then dispense with the need for a pressure button 212. However, at present, it is relatively expensive to incorporate spigots with the ceramic buttons 218.

Figure 6:
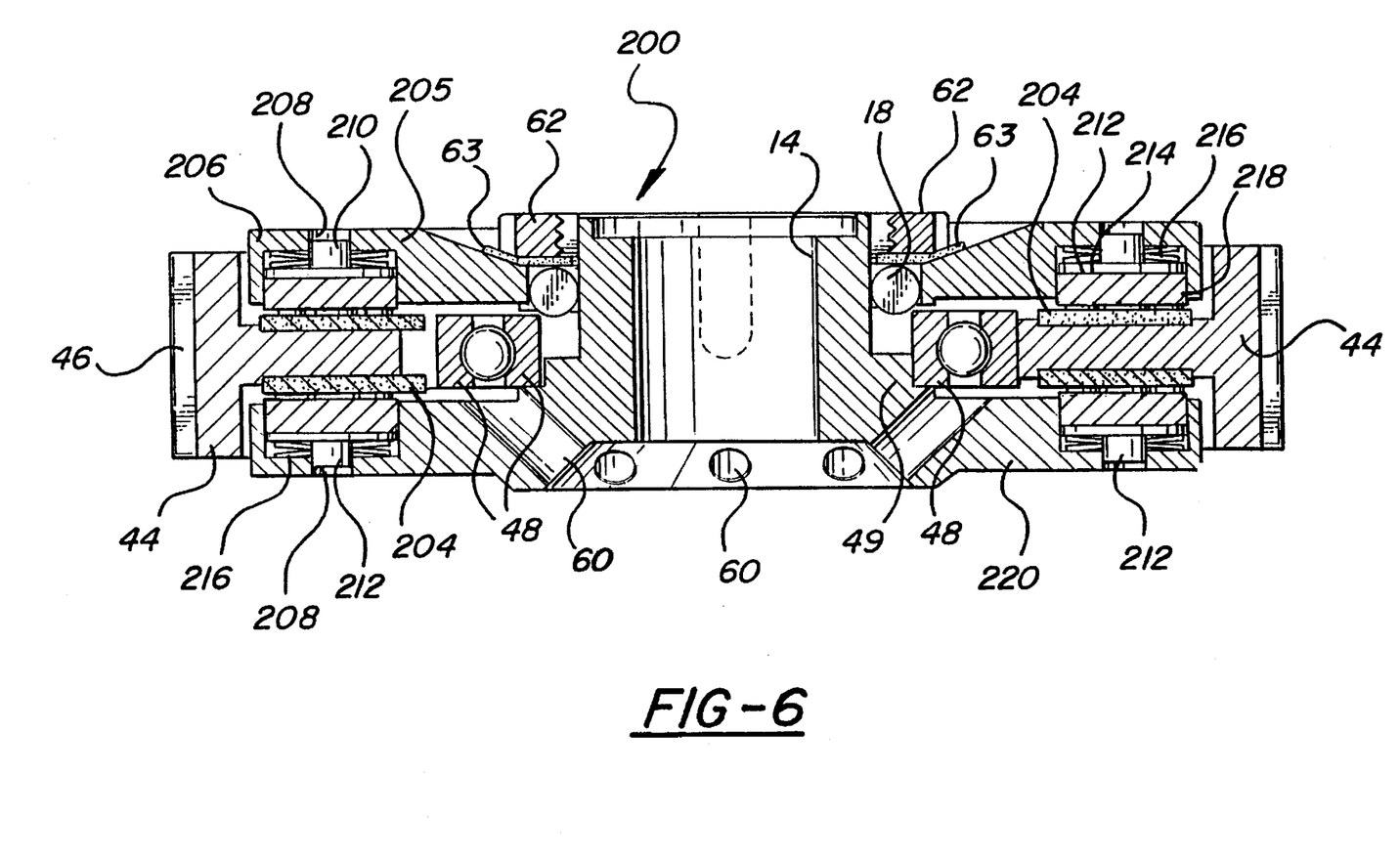
FIG. 6 is a sectional view of the torque regulating device of FIG. 5.

The discs 204 have inner faces 222 which are castellated with inwardly extending projections 224. Further, the regions 226 of the web 42 between the notches 61 have outer wider portions 228. In use, the projections 224 are located between regions 226 and are positively engaged and prevented from rotating relative to the web 42 by the wider portions 228. Thus, the discs 204 are positively located. As an alternative to the positive location described, the ceramic discs 204 could be bonded to the+web 42 by a suitable adhesive.

The use of a ceramic material has the advantage that the apparatus is able to withstand higher temperatures compared to apparatus using UHMW PE.

In use, the device 200 operates in a similar manner to the device 100 of FIG. 2.

By using a ceramic to ceramic rubbing surface, this does not have the temperature limitation of the UHMW PE. Preferably the ceramic material is a very fine grained high purity aluminium ceramic, typically about 99.9% pure. A ceramic material which is useful in the apparatus of the present invention is sold under the Trade Mark "ALSINT". A particularly suitable form of "ALSINT" is "ALSINT 99,7". The total wattage dissipated by the device 200 is then a function of the heat radiation capacity of the gear box 64. In nearly all cases this limit would not be reached. The upper temperature limit of the oil is generally the limiting factor.

Slip does not occur between the discs 204 and the web 42. Further, the domed projections 219 reduce the contact area of the ceramic faces which increases pressure and squeezes out oil between the contacting faces more efficiently. The oils used in conjunction with the apparatus of the present invention is chosen more of its heat dissipating qualities than its lubricating quality. For this purpose synthetic oil has been found to have superior qualities compared with mineral oil. However, good lubrication qualities are required for the bearings and gears associated with the apparatus of the present invention. A suitable synthetic oil is sold under the Trade Mark "SYNTHESO" and particularly suitable synthetic oils are "SYNTHESO HT 320" and "SYNTHESO D 460 EP".

The low friction material used in the apparatus of the present invention typically has a coefficient of friction no more than 0.05 such as in the range from 0.03 to 0.05. The present invention provides a torque regulating device in which the problems of torque spikes upon start up are reduced. The present invention may easily be installed in a gearbox as shown and utilise the lubricating oil contained within the gearbox for cooling of the device. Modifications and variations such as would be apparent to a skilled address are deemed within the scope of the present invention. For example, the gear wheel 44 may be replaced by a V-belt pulley or similar pulley.

I claim:

1. A torque regulating device adapted for continuous slipping at a predetermined torque value between a driven shaft and a drive member, the device including a disc adapted to be fixedly attached to a shaft and having an outer face and an inner face and, a bearing adjacent the inner face of the disc, drive gear wheel means carried on the bearing and arranged to receive an external driving force to transfer said driving force to the device, a low friction material disposed between the disc and the drive gear wheel means for allowing continuous slip of the disc relative to the drive gear wheel means at a substantially constant break-out torque without appreciable wear thereof, clamp means for clamping the friction material between the disc and the drive gear wheel means, the disc being provided with radially inclined passages extending longitudinally through the disc from the outer face to the inner face and angled radially outwardly from the outer face to the inner face to enable lubricating liquid assisted by centrifugal force to pass to the interior of the device adjacent the bearing and the friction material.

2. A torque regulating device adapted for continuous slipping above a predetermined value, said disc having a disc adapted to be fixedly attached to a shaft, drive gear wheel means adapted to be mounted about the shaft for receiving an external driving force to transfer same to the device, a low friction material disposed between the disc and the drive gear wheel means and clamping means clamping the friction material between the disc and the drive gear wheel means, wherein the low friction material has slipping faces and is ceramic, with the slipping faces ground to an extremely fine structure finish with an average surface roughness below about 55 microns.

3. A torque regulating device adapted for continuous slipping at a predetermined torque value between a driven shaft and a drive member, including a disc adapted to be fixedly attached to the shaft and having an outer face and an inner face, a bearing adjacent the inner face of the disc, drive gear wheel means carried on the bearing and arranged to receive an external driving force to transfer said driving force to the device, a low friction material disposed between the disc and the drive gear wheel means, clamp means for clamping the friction material between the disc and the drive gear wheel means, and the disc including radially inclined passages extending longitudinally through the disc from the outer face to the inner face and angled radially outwardly from the outer face to the inner face to enable a lubricating liquid assisted by centrifugal force to pass to the interior of the device adjacent the bearing and the friction material.

4. A torque regulating device according to claim 3 wherein the low friction material is in the form of a plurality of buttons and the device comprises a button cage in which buttons of low friction material are received and held relative to one another, the button cage comprises a plurality of apertures, each button having a circumferential flange and each button being received in an aperture in the button cage, the flanges of adjacent radially spaced buttons being disposed on opposite sides of the button cage to prevent the button cage from contact the gear wheel means and the disc.

5. A torque regulating device according to claim 3, wherein the disc has a threaded sleeve, and the clamp means comprises a locknut adapted to engage threadedly the threaded sleeve and to clamp the friction material against the gear wheel means.

6. A torque regulating device according to claim 5, wherein there is provided a lockwasher for preventing rotation of the locknut relative to the threaded sleeve.

7. A torque regulating device according to claim 5, wherein there is provided a further disc which is keyed to the threaded sleeve so that the first mentioned disc rotates in unison with the further disc.

8. A torque regulating device according to claim 5, wherein there is provided a further disc, a pressure plate located adjacent the further disc, which pressure plate is keyed to the threaded sleeve, a further low friction material disposed between the further disc and the gear wheel means, and spring means disposed between the further disc and the pressure plate, the spring means bearing on the further disc so that the further disc bears on the further low friction material and urges the further low friction material onto the gear wheel means.

9. A torque regulating device according to claim 3 wherein the low friction material is in the form of an annular disc.

10. A torque regulating device according to claim 9, wherein the annular disc of low friction material has one or more radial grooves to allow passage of the lubricating liquid.

11. A torque regulating device according to claim 3, wherein the low friction material is in the form of a plurality of buttons.

12. A torque regulating device according to claim 11, wherein the disc comprises a plurality of recesses and a button is located in a respective recess in the disc.

13. A torque regulating device according to claim 12, wherein the low friction material comprises an annular disc of low friction material and the buttons have faces which engage with the annular disc of low friction material, the annular disc of low friction material being disposed between the buttons and the gear wheel means such that the annular disc of low friction material is clamped between the buttons and the gear wheel means.

14. A torque regulating device according to claim 12, wherein the low friction material comprises an annular disc of low friction material and the buttons have faces which engage with the annular disc of low friction material, the annular disc of low friction material being disposed between the buttons and the gear wheel means such that the annular disc of low friction material is clamped between the buttons and the gear wheel means, and wherein the buttons are formed with a plurality of projections.

15. A torque regulating device according to claim 12, wherein the low friction material comprises an annular disc of low friction material and the buttons have faces which engage with the annular disc of low friction material, the annular disc of low friction material being disposed between the buttons and the gear wheel means such that the annular disc of low friction material is clamped between the buttons and the gear wheel means, and wherein the annular disc of low friction material is received and located in a corresponding annular recess in the gear wheel means.

16. A torque regulating device according to claim 12, wherein the low friction material comprises an annular disc of low friction material and the buttons have faces engaged with the annular disc of low friction material, the annular disc of low friction material being disposed between the buttons and the gear wheel means such that the annular disc of low friction material is clamped between the buttons and the gear wheel means, and wherein the gear wheel means has an annular recess and the annular disc of low friction material is received and located in the annular recess in the gear wheel means, and wherein the annular disc of low friction material is positively engaged by the gear wheel means so as to prevent the annular disc from rotating relative to the gear wheel.

17. A torque regulating device according to claim 3, wherein the low friction material is in the form of a plurality of buttons and the device comprises a button cage in which buttons of low friction material are received and held relative to each other.

18. A torque regulating device according to claim 17, wherein the button cage comprises a plurality of apertures, each button has a circumferential flange and is received in one of the apertures in the button cage.

19. A torque regulating device according to claim 17, wherein the button cage comprises a plurality of apertures, each button has a circumferential flange and is received in one of the apertures in the button cage, the flange of adjacent radially spaced buttons being disposed on opposite sides of the button cage to prevent the button cage from contacting the gear wheel means or the disc.

20. A torque regulating device according to claim 17, wherein the button cage comprises a plurality of first apertures, each button has a circumferential flange and is received in one of the plurality of apertures in the button cage, each flange of adjacent radially spaced buttons being disposed on opposite sides of the button cage to prevent the button cage from contacting the gear wheel means or the disc, and wherein the button cage has a periphery, the gear wheel means comprises an annular recess and some of the plurality of apertures are located on the periphery of the button cage and are open apertures configured such that a button received in one of the open apertures extends past an outer edge of the button cage to thereby centralize the button cage within the annular recess of the gear wheel means and to prevent the periphery of the button cage from contacting the gear wheel means.

21. A torque regulating device according to claim 3, wherein the drive gear wheel means has one or more notches extending therethrough to allow the passage of the lubricating liquid therethrough to cool the friction material.

22. A torque regulating device according to claim 3, wherein the low friction material is an ultra high molecular weight polyethylene.

23. A torque regulating device according to claim 22, wherein the ultra high molecular weight polyethylene has a molecular weight between 3 million and 8 million.

24. A torque regulating device according to claim 3, wherein the low friction material has slipping faces and is ceramic, with the slipping faces ground to an extremely fine structure finish.

25. A torque regulating device according to claim 24, wherein the slipping faces are ground to an average surface roughness below about 55 microns.

26. A torque regulating device according to claim 3, wherein there is provided a further disc which is keyed to the threaded sleeve so that the first mentioned disc rotates in unison with the further disc, a pressure plate located adjacent the further disc, and spring means disposed between the further disc and the pressure plate, the spring means bearing on the further disc so that the further disc urges the friction material onto the gear wheel means.

27. A torque regulating device according to claim 26, wherein the spring means is in the form of at least one spring washer.

28. A torque regulating device according to claim 26, wherein the spring means is in the form of at least one spring washer and the further disc has at least one spigot passing through the at least one spring washer.

29. A torque regulating device according to claim 26, wherein the spring means is in the form of at least one spring washer, the further disc has at least one spigot passing through the at least one spring washer, and the pressure plate has apertures corresponding to the or each spigot, each spigot being slidably received in a corresponding one of the apertures.

* * * * *